United States Patent
Hata

(10) Patent No.: US 7,564,146 B2
(45) Date of Patent: *Jul. 21, 2009

(54) MOVING BODY STARTING SYSTEM

(75) Inventor: Toshiaki Hata, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 326 days.

This patent is subject to a terminal disclaimer.

(21) Appl. No.: 11/091,394

(22) Filed: Mar. 29, 2005

(65) Prior Publication Data

US 2006/0087177 A1    Apr. 27, 2006

(30) Foreign Application Priority Data

Oct. 25, 2004    (JP)    ............................. 2004-310016

(51) Int. Cl.
B60R 25/04 (2006.01)
E05B 17/00 (2006.01)
H01H 27/00 (2006.01)

(52) U.S. Cl. .................................................... 307/10.3
(58) Field of Classification Search ................ 307/10.3, 307/9.1, 10.1–10.6; 340/426.13, 426.16, 340/426.17, 426.31
See application file for complete search history.

(56) References Cited

U.S. PATENT DOCUMENTS 5,721,537 A * 2/1998 Protas ........................ 340/7.1

2005/0029871 A1* 2/2005 Mori et al. .................. 307/10.3
2006/0106525 A1* 5/2006 Hata .......................... 701/113

FOREIGN PATENT DOCUMENTS

| JP | 63-093649 A | 4/1988 |
| JP | 2003-269019 A | 9/2003 |
| JP | 2003-301764 A | 10/2003 |

* cited by examiner

Primary Examiner—Albert W Paladini
Assistant Examiner—Carlos Amaya
(74) Attorney, Agent, or Firm—Sughrue Mion, PLLC

(57) ABSTRACT

A moving body starting system includes: a moving-body-mounted unit mounted in a moving body moved by an engine; a portable unit carried by a user performing radio communication with the mounted unit; an operation switch provided on a moving body side and outputting an operation signal to the mounted unit upon user's operation; a steering unlocking unit unlocking a steering lock mechanism provided on the moving body side; and a moving body power supply control unit provided on the moving body side to perform control on power supply to an engine control device of the moving body, in which the mounted unit includes: an authentication unit performing an authentication processing by radio communication with the portable unit; and an operation control unit, after the authentication, causing at least one of the unlocking unit and the power supply control unit to perform a predetermined processing base on the input operation signal.

6 Claims, 7 Drawing Sheets

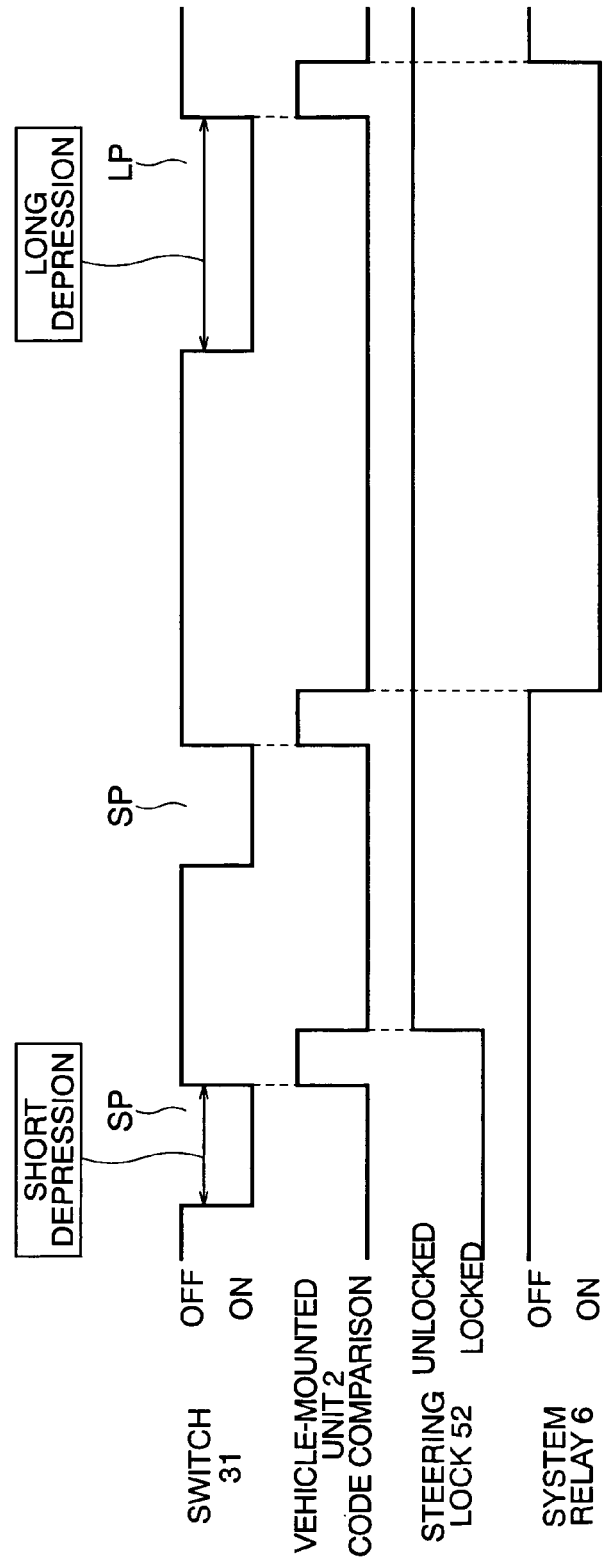

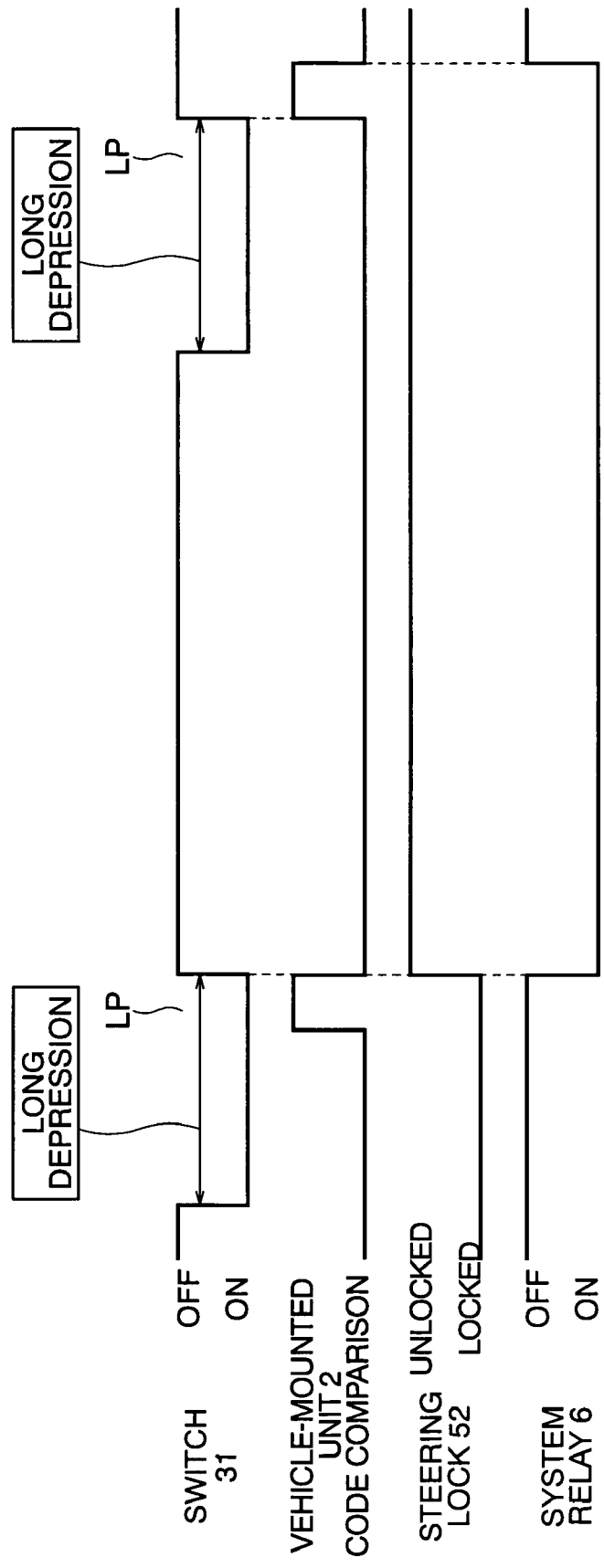

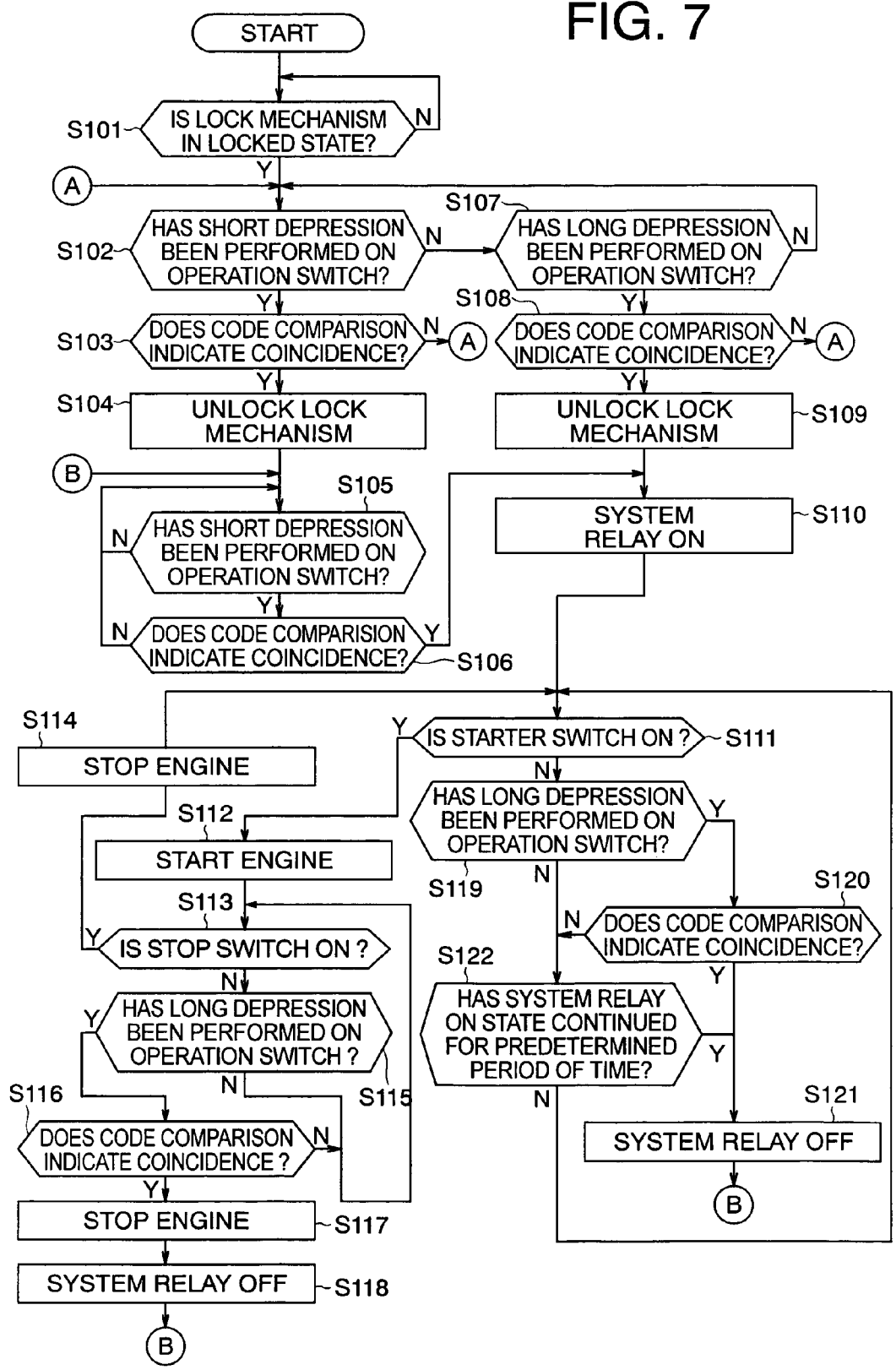

MOVING BODY STARTING SYSTEM

BACKGROUND OF THE INVENTION

1. Field of the Invention

The present invention relates to a moving body starting system, in particular, a starting system for a moving body driven by a driving force generating device inclusive of an engine or a motor, such as a two-wheeled vehicle, an ATV (all terrain vehicle), a ship, or a jet-propelled boat, the starting system being endowed with a theft prevention effect.

2. Description of the Related Art

Conventionally, to start a vehicle's engine, a key switch that starts the engine is mechanically turned on using a cylinder key given to the authorized driver of the vehicle alone. Accordingly, starting the engine is impossible without an authorized key, thereby preventing theft of the vehicle. However, even though theft of the vehicle is prevented by relying on the key, it is not necessarily possible to attain a sufficient antitheft effect because the key is relatively easily duplicated.

Thus, there is a system for enhancing the antitheft effect in which the information designating a key for the vehicle is sent from the key to the key cylinder, and the key cylinder identifies the sent information and permits the start of engine only if the sent information is identified as authorized information.

Specifically, a pair of magnetic circuits are provided, consisting of a key coil wound around an axial core inside the key inserted into a key insertion hole which is placed in proximity to a rotor coil wound around an annular core disposed around the periphery of a key insertion hole on the key cylinder side, whereby the information for driving the engine is passed via this pair of magnetic circuits between the key and the key cylinder (See JP 04-15141 B, for example).

Although the conventional vehicle starting system device with antitheft functions of this type attains some effect to prevent the theft of a vehicle but has a problem in that inserting and turning a key into the key cylinder, which also serves as an electrical switch, is troublesome. There is also another problem in that a mechanical failure is likely to occur as a result of inserting and turning a key in the key cylinder.

Also, there is a problem that there are no antitheft precautions provided for when the driver leaves the vehicle with the key inserted into the key cylinder.

Also, in starting the engine at night, the driver can not see an insertion hole for the key cylinder in the darkness, therefore taking a long time to start the engine. To solve this problem, such a measure as placing a lamp on the key cylinder side may be taken, but in the case of inexpensive two wheelers especially, installing the lamp in not preferred as the cost increases.

Moreover, the design in proximal area of the driver's seat is restricted due to the existence of the key cylinder.

SUMMARY OF THE INVENTION

The present invention has been made with a view toward solving the above problems in the prior art. It is an object of the present invention to provide a moving body starting system in which the use of a key and a key cylinder has been abolished and in which it is possible to easily effect the unlocking of a steering lock mechanism, and the start permission or operation stop of a driving force generating device, such as an engine, without using any key.

The present invention provides a moving body starting system including: a moving-body-mounted unit mounted in a moving body moved by a driving force generating device; a portable unit carried by a user performing radio communication with the moving-body-mounted unit; an operation switch provided on a moving body side and adapted to output an operation signal to the moving-body-mounted unit upon operation by the user; a steering unlocking means for unlocking a steering lock mechanism provided on the moving body side; and a moving body power supply control means provided on the moving body side, for performing control on power supply to a driving force generating device control device of the moving body, the moving body starting system being characterized in that the moving-body-mounted unit includes: an authentication means for performing an authentication processing by radio communication with the portable unit; and an operation control means for, after authentication of the portable unit by the authentication means, causing at least one of the steering unlocking means and the moving body power supply control means to perform a predetermined processing in accordance with the input operation signal.

In the present invention, through a combination of the moving-body-mounted unit mounted in the moving body moved by the driving force generating device, the portable unit carried by the user performing radio communication with the moving-body-mounted unit, and the operation switch provided in the moving body and adapted to output an operation signal to the moving body mounting unit in accordance with the operation by the user, it is possible to easily effect the unlocking of the steering lock mechanism of the moving body, and the start permission or operation stop of the driving force generating device, such as an engine, and it is also possible to provide a theft prevention effect.

BRIEF DESCRIPTION OF THE DRAWINGS

In the accompanying drawings:

FIG. 5 is a time chart for illustrating the operation of a moving body (vehicle) starting system according to an embodiment of the present invention when a short depression operation is performed on the operating switch at the start;

FIG. 6 is a time chart for illustrating the operation of a moving body (vehicle) starting system according to an embodiment of the present invention when a long depression operation is performed on the operating switch at the start; and FIG. 7 is a schematic operational flowchart illustrating the operation of a control portion of the vehicle-mounted unit of a moving body (vehicle) starting system according to an embodiment of the present invention.

DETAILED DESCRIPTION OF THE PREFERRED EMBODIMENTS

While the present invention is applicable to moving bodies in general including ships and vehicles equipped with a driving force generating device, such as an engine or a motor, a description will be given below of a case in which the present invention is applied to a two-wheeled vehicle.

Embodiment 1

Figure 1:
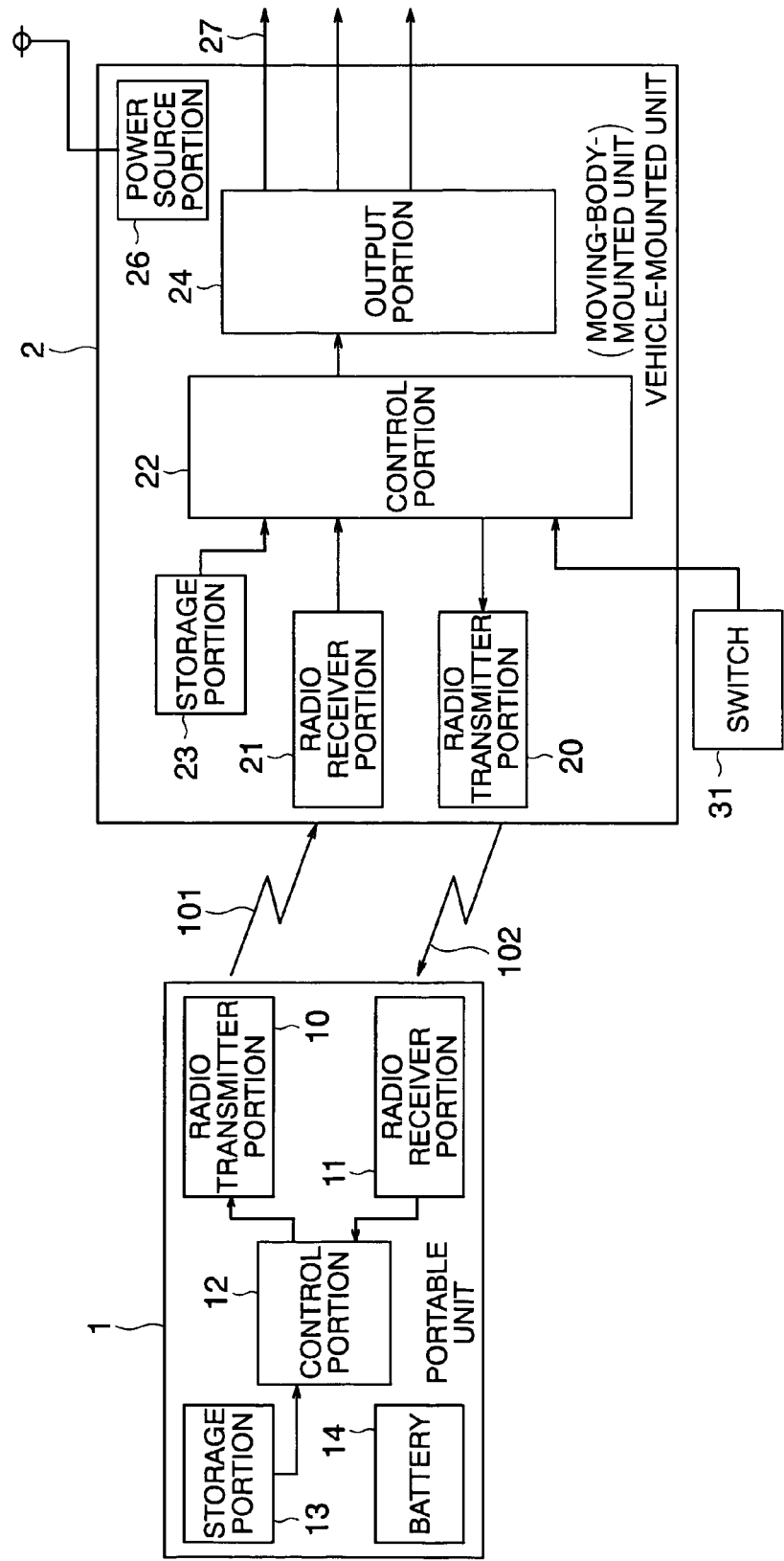
FIG. 1 is a block diagram schematically showing the construction of a portable unit and a vehicle-mounted unit of a moving body (vehicle) starting system according to an embodiment of the present invention.

FIG. 1 is a block diagram schematically showing the construction of a portable unit and a vehicle-mounted unit of a moving body (vehicle) starting system according to an embodiment of the present invention. A portable unit 1 is carried by the user of a vehicle, e.g., the driver, during driving, and a vehicle-mounted unit 2 is mounted in the vehicle and performs communication with the portable unit by, for example, electromagnetic waves. The portable unit 1 includes a radio transmitter portion 10 and a radio receiver portion 11 which perform radio communication with the vehicle-mounted unit 2 by using, for example, a coil-shaped antenna (not shown), a control portion 12 formed by a logic circuit, a micro computer, etc. performing a predetermined processing in accordance with what is to be communicated, a storage portion 13 consisting of memory storing a code described below, etc., and a battery 14 serving as a power source.

On the other hand, the vehicle-mounted unit 2 includes a radio transmitter portion 20 and a radio receiver portion 21 which perform radio communication with the portable unit 1 by using an antenna (see FIG. 2) or the like, a control portion 22 formed by a logic circuit, a micro computer, etc. performing a predetermined start control processing in accordance with what is to be communicated, a storage portion 23 consisting of memory storing a code described below, etc., an output portion 24 which processes in the control portion 22 an operation signal output from an operation switch 31 upon operation of the operation switch 31, consisting, for example, of a push button switch and which outputs an operation control signal, etc. based on the processing result to a connected apparatus (see FIG. 2), and a power source portion 26. As the power source portion 26, a power source on the vehicle side (see FIG. 2) is used.

Figure 2:
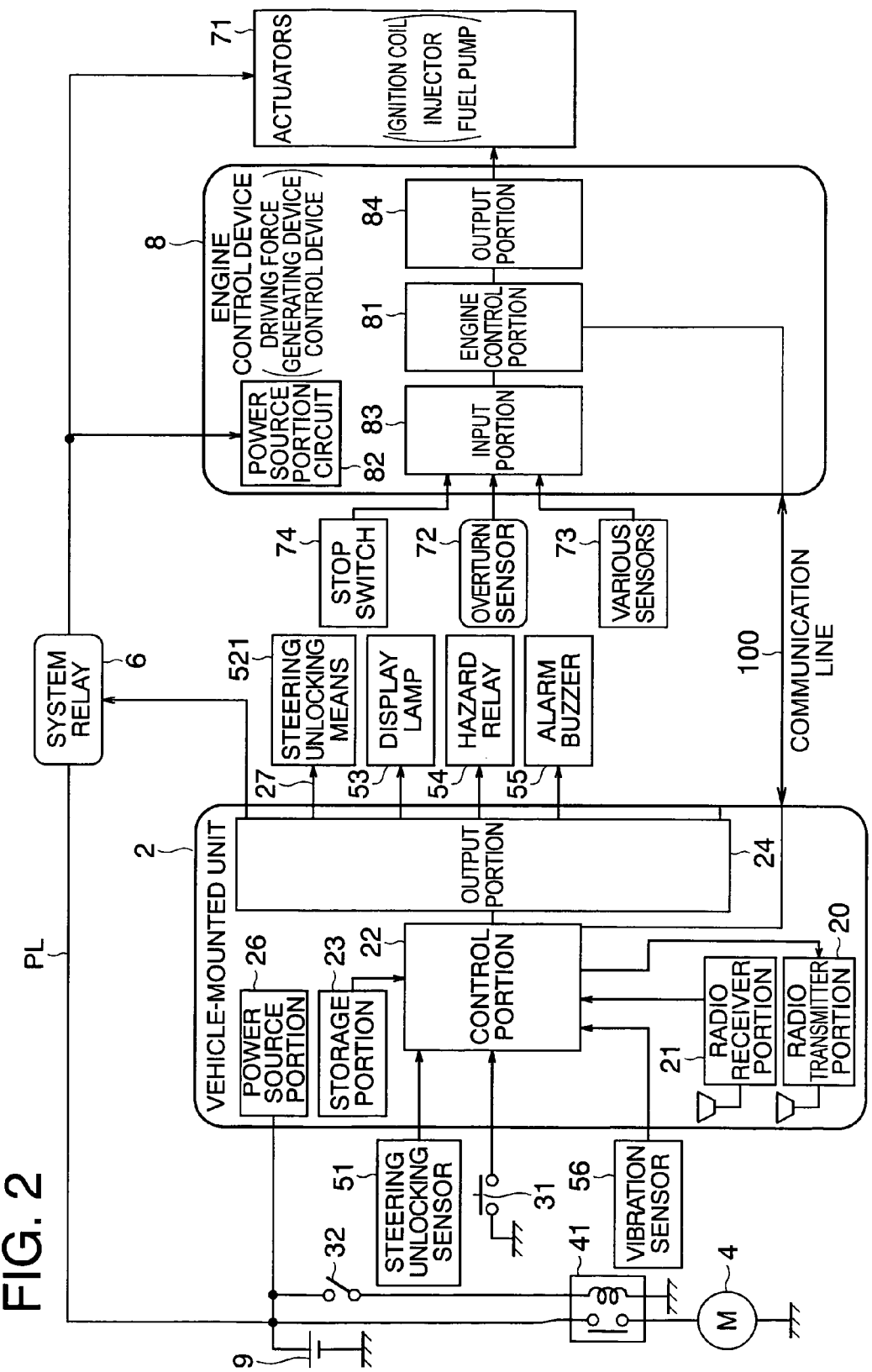
FIG. 2 is a block diagram schematically showing the construction of the vehicle-side portion of a moving body (vehicle) starting system according to an embodiment of the present invention.

FIG. 2 is a block diagram schematically showing the construction of the vehicle-side portion of a moving body (vehicle) starting system according to the present invention. The vehicle-mounted unit 2 is the same as the one shown in FIG. 1, and, connected to the input side of the control portion 22 (It is also possible to provide an input portion) are a steering unlocking sensor 51, a vibration sensor 56 for vehicle theft prevention, and the operation switch 31 to be operated by the operator, and, connected to the output portion 24 are a steering unlocking means 521, a display lamp 53, a hazard relay 54, an alarm buzzer 55, and a system relay 6 inserted into a power source line PL of the vehicle.

An engine control device 8 performs a predetermined processing in an engine control portion 81 in accordance with signals from an overturn sensor 72, various sensors 73 for engine control, a stop switch 74, etc. that are input to an input portion 83, and outputs a control signal from an output portion 84 to actuators 71 composed of an ignition coil, an injector, a fuel pump, etc. The engine control device 8 has a power source portion 82 which is supplied, together with the actuators 71, with a voltage from a vehicle battery 9 through the power source line PL into which the system relay 6 is inserted.

The circuit on the left-hand side of the vehicle-mounted unit 2 is a circuit provided on the vehicle side; when a starter switch 32 is operated by the operator to be closed, a starter relay 41 is turned on, and power is supplied to a starter motor 4 from the battery 9, thereby starting the engine.

The steering unlocking sensor 51 connected to the control portion 22 of the vehicle-mounted unit 2 and the steering unlocking means 521 connected to the output portion 24 are the same as those provided in a steering locking mechanism 52 shown in FIGS. 3A and 3B described below. The display lamp 53 connected to the output portion 24 effects display of abnormality in the unlocking of the steering, display of abnormality in the starting of the engine control device 8, warning of theft, etc. The hazard relay 54 displays an answer back through a flasher lamp constituting a hazard lamp (not shown) when the result of code comparison indicates coincidence, or flashes at the time of theft for warning. The alarm buzzer 55 gives a warning in the form of sound when a theft occurs. The vibration sensor 56 connected to the control portion 22 detects any vibration of the vehicle when the engine operation is prohibited, thus sensing occurrence of theft.

In the engine control device 8, the engine control portion 81 constitutes an engine operation control means which performs engine operation control by operating the actuators 71, consisting of the ignition coil, the injector, the fuel pump, etc. through the output portion 84 based on the engine operating condition. Connected to the input portion 83 of the engine control portion 81 are the various sensors 73 consisting of detection sensors for detecting the intake air temperature, water temperature, intake air amount, etc. needed for engine control, detection sensors for detecting crank angle, throttle opening, etc., the overturn sensor 72 for detecting overturn of the vehicle, the stop switch 74 for quickly stopping the engine alone (which is generally called a kill switch), etc. Further, the engine control device 8 and the vehicle-mounted unit 2 are connected to each other by a communication line 100, effecting a two-way signal (information) communication.

Figures 3A, 3B:
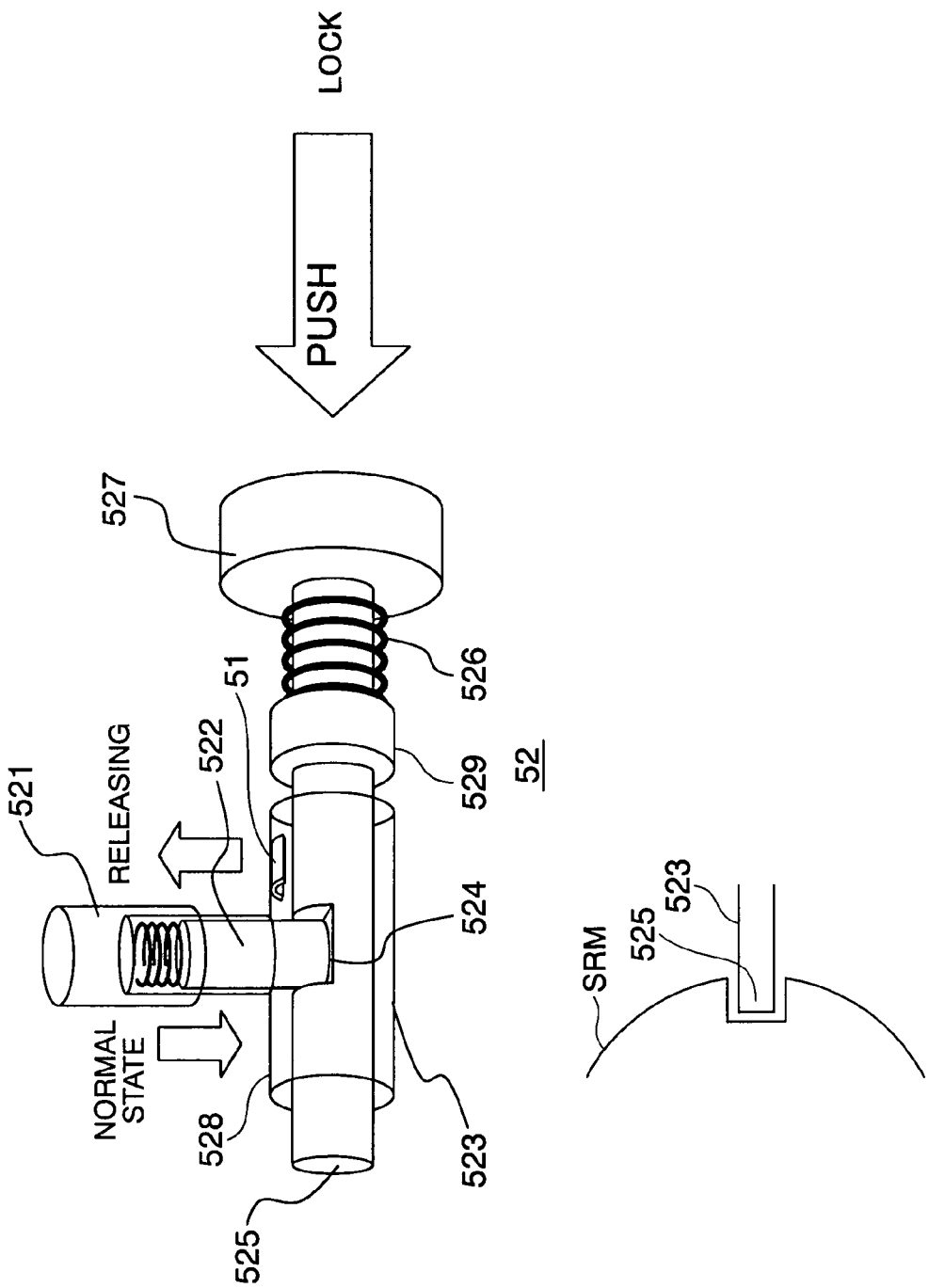
FIG. 3A is a diagram showing an example of a vehicle-side steering lock mechanism equipped with a steering locking/unlocking means according to the present invention (for a two-wheeled vehicle)
FIG. 3B is a diagram showing the relationship between a steering locking mechanism and a steering rotary member.

FIGS. 3A and 3B show an example of the vehicle-side steering locking mechanism 52 (for two-wheeled vehicles) equipped with the above-described steering unlocking means 521. In the case of a two-wheeled vehicle or the like, it ought to be called a handle locking mechanism; it should be noted, however, that the present invention is not restricted to two-wheeled vehicles or the like, so, in the following description, it will be referred to as the steering locking mechanism. FIG. 3A shows a state in which the steering lock mechanism 52 is locked, that is, the locked state; a stopper 522 of an electromagnetic solenoid 521, which constitutes the steering unlocking means 521 in FIG. 2, is engaged with an engagement portion 524 of a lock bar 523 inside an outer sheath 528, and an end portion 525 of the lock bar 523 is engaged with a steering rotary member SRM as shown in FIG. 3B, thus effecting locking so as to prevent rotation of the steering. When, in this state, the electromagnetic solenoid 521 is energized, the stopper 522 moves upwards against the restoring force of a spring 522a, and the lock bar 523 is caused to move in the direction of a lock button 527 (i.e., to the right in the drawing) by the restoring force of a spring 526 while borne by a bearing 529, the end portion 525 being released from the engagement with the steering rotary member SRM to thereby effect unlocking.

The locking of the steering lock mechanism 52 is effected manually by the operator, that is, by pushing the steering lock button 527 against the restoring force of the spring 526; when the lock bar 523 is restored to the position as shown in FIG. 3A, the stopper 522 is caused to fit into the engagement portion 524 of the lock bar 523 by the restoring force of the spring 522a to thereby attain a locked state. Further, by a steering unlocking sensor 51 provided in the outer sheath 528 and consisting of a proximity switch or the like, the position of the engagement portion 524, which is a recess in the lock bar 523, is detected, whereby the unlocking of the steering lock mechanism 52 is detected (The unlocked state is detected when the engagement portion 524 in the form of a recess comes under the steering unlocking sensor 51).

The engine constitutes the driving force generating device, the engine control device 8 constitutes the driving force generating device control device, the vehicle-mounted unit 2 constitutes the movable-body-mounted unit, the control portion 22 of the vehicle mounted unit 2 constitutes the operation control means, the control portion 22 and the transmitter portion 20 and the receiver portion 21 constitute an authentication means, and the system relay 6 constitutes a moving body (vehicle) power supply control means.

Next, the basic operation at the vehicle start will be described. When the operation switch 31 is turned on by the driver, a trigger signal for code comparison is radio-transmitted from the vehicle-mounted unit 2 through the transmitter portion 20 as indicated at 102 in FIG. 1. When the operator with the portable unit 1 exists in this transmission range, the receiver portion 11 of the portable unit 1 receives this signal. The control portion 12 judges from the received signal whether a code is to be transmitted or not. This can be replaced by a judgment as to whether a so-called ID code has been received or not (ID authentication). That is, a judgment is made as to from which vehicle the ID code has been transmitted, a response being only given to a code transmitted from the vehicle of the user or a vehicle using the same system. When it is determined that the code has been transmitted from the vehicle of the user or a vehicle using the same system, the control portion 12 calls up a previously stored code from the storage portion 13, and radio-transmits it through the transmitter portion 10 as indicated at 101 in FIG. 1.

The battery 14 is a power supply source for operating each portion of the battery 14, and is on standby for a reception signal in a low consumption mode so that no power is consumed until next signal reception after the completion of transmission. Further, it is started upon receiving a reception signal, operating so as to allow power supply, which means it is an energy saving type capable of suppressing battery consumption. And, the control portion 12 is started only when the reception signal received by the receiver portion 11 is a predetermined signal (a predetermined ID code), transmitting a code in the storage portion 13. The judgment on this ID code is effected, for example, through comparison with a signal from a signal generation circuit (not shown) formed by a logic circuit in the control portion 12.

The vehicle-mounted unit 2 receives this code through the receiver portion 21, and the control portion 22 calls up a previously stored code, these code being compared with each other. When the comparison result indicates coincidence in code, a judgment is made based on a signal from the steering unlocking sensor 51 as to whether the steering lock mechanism 52 of FIG. 3A is in the locked state or not; when it is in the locked state, the control portion 22 outputs an operation control signal 27 from the output portion 24 to the steering unlocking means 521 so as to unlock it. As a result, power is supplied to the electromagnetic solenoid 521 of FIG. 3A, and the stopper 522, which has been engaged with the engagement portion 524 of the lock bar 523, is moved upwards (the direction of releasing) to be detached therefrom, so that the lock bar 523 is caused to move in the direction of the steering lock button 527 by the restoring force of the spring 526, and the end portion 525 is released from the engagement with the steering rotary member SRM, thereby effecting unlocking. If, at this time, the codes do not coincide with each other, the control portion 22 does not operate. The code comparison result may be recognized from actual changes in the condition of the steering lock mechanism 52, etc. or from a display through the flasher lamp (not shown) driven by the hazard relay 54.

When, in this condition, the operation switch 31 is turned on by the driver, the vehicle-mounted unit 2 transmits an ID code to the portable unit 1 to obtain a code as described above, and the code obtained from the portable unit 1 and the code of the vehicle-mounted unit 2 are compared with each other (authentication processing for the portable unit through code comparison). It can be seen from a signal from the steering unlocking sensor 51 that the steering lock mechanism 52 of FIG. 3A is in the unlocked state, so that, when the comparison result indicates code coincidence, the control portion 22 outputs this time an operation control signal from the output portion 24 to the system relay 6 to turn it on. As a result, the engine control device 8 is supplied with power from the battery 9 to be placed in a start state. Further, the control portion 22 outputs an engine start permission signal to the engine control device 8 through the communication line 100.

When the vehicle is in an engine start prohibition state in which no engine start permission signal is supplied from the control portion 22 to the engine control device 8, the vibration sensor 56 detects any vibration of the vehicle at the time of theft, and the hazard lamp (not shown) of the hazard relay 54, the alarm buzzer 55, etc. accordingly issue a warning in the form of light, sound, etc.

Figure 4:
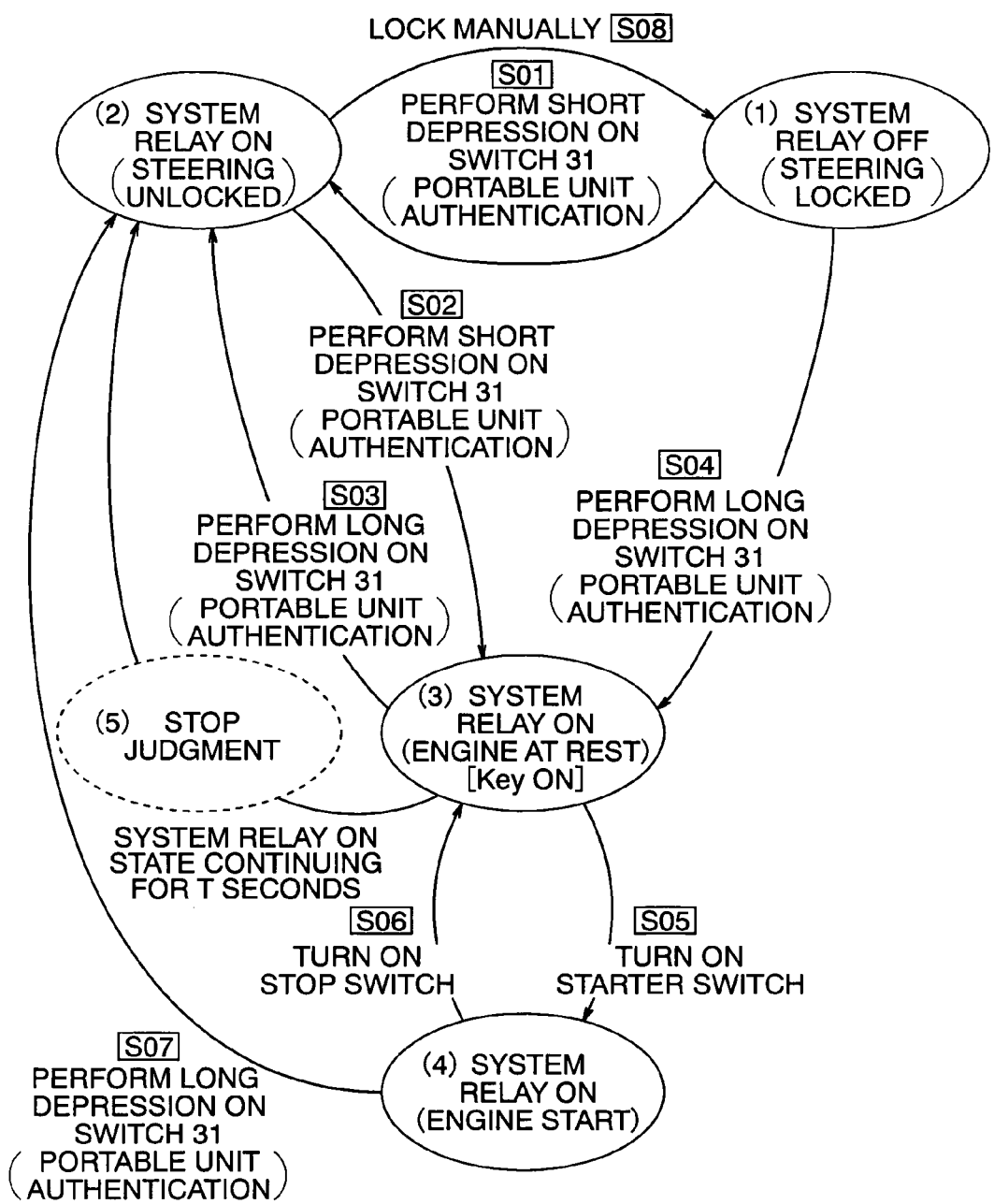
FIG. 4 is a condition transition chart showing the operation of a moving body (vehicle) starting system according to the present invention.

Next, the operation from the unlocking of the steering lock mechanism and the starting of the engine by the driver, that is, the operation from the unlocked mode to the engine start via an engine-control-device-start/engine-operation-permission mode will be described. FIG. 4 is a condition transition diagram illustrating the operation of the moving body starting system of the present invention. In FIG. 4, condition (1) is the initial state of the system, in which the system relay 6 is off and the steering lock mechanism 52 is locked. By performing short depression on the operation switch 31 in condition (1) (S01), the vehicle-mounted unit 2 performs the above-described portable-unit authentication processing; when the code from the portable unit 1 and the code of the vehicle coincide with each other, the steering lock mechanism 52 is unlocked, and transition to condition (2) is effected. When the codes do not coincide with each other, condition (1) continues. The expression "short depression" refers to a manner of depression in which the length of time that the operation switch 31 is kept depressed is not more than a predetermined length of time, whereas, the expression "long depression", mentioned below, refers to a manner of depression in which the length of time that the operation switch 31 is kept depressed exceeds the predetermined length of time. Further, from this onward, each time the operation switch 31 is depressed, the above-described portable-unit authentication processing through code comparison is effected.

In condition (2), the system relay is off, and the steering lock mechanism is in the unlocked state. When, in this condition (2), short depression is performed again on the operation switch 31 (S02), the vehicle-mounted unit 2 conducts portable-unit authentication processing; when the codes coincide with each other, the system relay 6 is turned on, and the engine control device 8 is placed in the starting state, and, further, engine operation is permitted. As a result, the system relay 6 is turned on, the steering lock mechanism 52 is placed in the unlocked state, and the engine is placed in condition (3) in which the engine is at rest (key-ON state). At this time, power supply to the engine control device 8 and the various actuators 71, such as the ignition coil, the injector, and the fuel pump, is started; at the same time, the control portion 22 of the vehicle-mounted unit 2 supplies an engine start permission signal through the communication line 100 to the engine control portion 81 of the engine control device 8, placing the various actuators 71 in the start permission state. Further, when, in condition (3), the system relay 6 is to be turned off, long depression is performed on the operation switch 31 (S03); when the codes coincide with each other in the authentication processing, the system is restored to condition (2), thereby restoring it to the engine start prohibition state.

Further, when, in condition (3), the state in which the system relay 6 is on continues for a predetermined period of time (e.g., T seconds; T=600 seconds), and no transition to other condition is effected, a stop judgment in (5) is made, and the system is restored to condition (2). Further, when, in condition (3), the starter switch 32 is turned on by, for example, the driver (S05), it is possible to start the engine, the system relay 6 being turned on, the steering lock mechanism 52 being placed in the unlocked state, and the engine being placed in condition (4), which is the engine start state. And, when in condition (4), the stop switch 74 is turned on by the driver (S06), only the engine operation is stopped and transition to condition (3) is effected.

Further, when the engine is to be stopped during its operation in condition (4), long depression is performed on the operation switch 31 (S07), and transition to condition (2) is effected. At this time, the system relay 6 is turned off, so that power ceases to be supplied to the engine control device 8 side, and the engine stops; however, it is also possible to supply an engine stop signal from the control portion 22 of the vehicle-mounted unit 2 to the engine control portion 81 of the engine control device 8 through the communication line 100. The transition from condition (2) to condition (1) is effected by, for example, the driver, who has only to manually push the steering lock button 527 (S08). When transition from condition (1) to condition (3) is to be effected, i.e., the key-ON state is to be attained, at a stroke, long depression is performed on the operation switch 31 (S04), whereby it is possible to effect the unlocking of the steering lock mechanism 52 and the turning on of the system relay 6 substantially at the same time. At this time, portable-unit authentication processing through code comparison in the vehicle-mounted unit 2 is performed only once, thus realizing a reduction in time.

FIG. 5 is a time chart showing the operation signal from the operation switch 31, the code comparison in the vehicle-mounted unit 2, the unlocking state of the steering lock mechanism 52, and the ON/OFF states of the system relay 6 when operations are successively conducted through short depression SP of the operation switch 31 at the start. When successively operating the operation switch 31 through short depression SP, code comparison in the vehicle-mounted unit 2 is effected after short depression SP; when the codes coincide with each other, the unlocking of the steering lock mechanism and the turning on of the system relay are respectively conducted, and long depression LP is performed on the operation switch 31 after the turning on of the system relay, whereby the system relay is turned off after the code comparison.

On the other hand, FIG. 6 is a time chart showing the operation signal from the operation switch 31, the code comparison in the vehicle-mounted unit 2, the unlocking state of the steering lock mechanism 52, and the ON/OFF states of the system relay 6 when operations are conducted through long depression LP of the operation switch 31 at the start. In this case, through long depression LP of the operation switch 31, the unlocking of the steering lock mechanism and the turning on of the system relay are effected substantially at the same time. As a result, the code comparison in the vehicle-mounted unit 2 is effected only once, thus achieving a reduction in time for transition to the start mode of the engine control device 8 (condition (3) in FIG. 4).

FIG. 7 is a flowchart schematically showing the operation in the control portion 22 of the vehicle-mounted unit 2. This operational flow chart partially includes the operation of the engine control portion 81 of the engine control device 8, etc. When, in the condition corresponding to condition (1) of FIG. 4, in which it is determined by the steering unlocking sensor 51 that the steering lock mechanism 52 is in the locked state (S101), short depression (SP) is effected on the operation switch 31 (S102), the steering lock mechanism 52 is unlocked (S104) when the codes coincide with each other in the above-described authentication processing (S103). This corresponds to condition (2) in FIG. 4, and the engine start permission state has not been attained yet. In this condition, short depression (SP) is effected on the operation switch 31 (S105); when the codes coincide with each other in the authentication processing (S106), the system relay 6 is turned on (S110). This corresponds to condition (3) in FIG. 4; as described above, in this condition, power is started to be supplied to the engine control device 8 and the various actuators 71, such as the ignition coil, the injector, and the fuel pump, and, at the same time, although not shown, an engine start permission signal is supplied to the engine control device 8 through the communication line 100, bringing the various actuators into a start permission state.

On the other hand, when, in the condition of step S101, long depression (LP) is effected on the operation switch 31 for a period longer than a predetermined length of time (S107), if the codes coincide with each other in the authentication processing (S108), the steering lock mechanism 52 is unlocked (S109), the system relay 6 is turned on (S110), and the condition of step S110 is attained at a stroke. At this time, as in the above case, an engine start permission signal is supplied to the engine control device 8 through the communication line 100.

In the engine control device 8, when, in the condition of step S110, the starter switch 32 is turned on (S111), the engine is started (S112). This corresponds to condition (4) in FIG. 4.

On the other hand, in the control portion 22 of the vehicle-mounted unit 2, long depression (LP) is effected on the operation switch 31 in the condition of step S110 (S119); when the codes coincide with each other in the authentication processing (S120) or when the condition of step S110 continues for a predetermined period of time without transition to other condition (S122), the system relay 6 is turned off (S121), and the system is restored to the condition of step S104.

Further, in the engine control device 8, if, when the engine has been started in step S112 and is running, the stop switch 74 is turned on (S113), the engine is stopped (S114), and the system is restored to the condition of step S110.

On the other hand, in the control portion 22 of the vehicle-mounted unit 2, when, in the condition of step S112, long depression (LP) is effected on the operation switch 31 (S115) and the codes coincide with each other in the authentication processing (S116), the control portion 22 supplies an engine stop signal to the engine control portion 81 of the engine control device 8 through the communication line 100 to stop the engine (S117) and, at the same time, the system relay 6 is turned off (S118), the system being restored to the condition of step S104. As a result, the control portion 22 of the vehicle-mounted unit 2 is restored to the engine start prohibition state. Steps S111 through S114 are related to the operation of the engine control portion 81 of the engine control device 8.

When the engine control device 8 is of the type which is automatically switched between the engine start permission state and the start prohibition state according to where there is power supply or not, and when the power supply is stopped to make the engine control impossible, and the engine is automatically stopped without involving any problem for the subsequent control, there is no need for passing signals between the control portion 22 of the vehicle-mounted unit 2 and the engine control portion 81 of the engine control device 8 through the communication line 100.

As described above, according to the present invention, the use of a key and a key cylinder is abolished, and the unlocking of the steering lock mechanism and the turning on/off of the system relay are effected through a combination of the operation switches of the portable unit and the vehicle-mounted unit, so that there is no need to take the trouble to insert the key into the key cylinder and turn it therein, and, solely by depressing a single button (operation switch) mounted to the vehicle, it is possible to easily perform the unlocking of the steering lock mechanism and the control of power supply to the engine control device, and give instructions regarding the permission of engine operation and the engine operation stop. Further, it is also possible to prevent mechanical failure that might be caused by the insertion of the key into the key cylinder.

Since the portable unit performs unlocking, when the driver is carrying the portable unit, it is not possible for others to release the steering lock or permit the operation of the engine. Hence, the theft of the vehicle is prevented when the driver leaves the vehicle with the key inserted into the key cylinder.

Further, since there is no need to insert the key into the key cylinder, the driver does not need to search for the insertion hole of the key cylinder in the darkness when starting the engine at night, and can easily release the steering lock mechanism and start the engine. Also, a low cost system can be provided as it is unnecessary to take the expensive measure of installing a lamp on the key cylinder. Also, as the key cylinder itself is disposed of, degree of freedom in regards to the design in proximal area of the driver's seat increases.

Also, in a state where the engine operation is disabled by the control portion, the vibration sensor senses a vibration of the vehicle at the time of theft, and raises the alarm by light or sound with the hazard lamps or the alarm buzzer, whereby the driver and surrounding people are surely informed of an occurrence of theft thereby enhancing the antitheft function.

Further, since the engine operation is disabled on the basis of transition of the engine from the operating state (condition (4) in FIG. 4) to the stopped state (condition (2) in FIG. 4), the restarting of the engine is rapidly inhibited after the stopping of the engine to enhance the antitheft function.

Further, when, after the permission of engine start, the engine continues to be at rest for a predetermined period of time or longer, engine start is prohibited by the system relay and signal, so that it is more difficult to steal the vehicle when the driver is away from it for a short while with the engine in the start permission state, thus achieving a further improvement in terms of theft preventing function.

While in the above-described embodiment the system of the present invention is applied to a two-wheeled vehicle, it goes without saying that the present invention is applicable to various other moving bodies, etc. driven by a driving force generating device like an internal combustion engine, a motor or the like, such as ATVs, ships, jet-propelled boats, and vehicles.

What is claimed is:

1. A moving body starting system comprising:
a moving-body unit mounted in a moving body moved by a driving force generating device;
a portable unit carried by a user performing radio communication with said moving-body unit;
an operation switch provided on a moving body side and adapted to output an operation signal to said moving-body unit upon operation by the user;
a steering unlocking section for unlocking a steering lock mechanism provided on the moving body side; and
a moving body power supply control section provided on the moving body side, for performing control on power supply to a driving force generating device control device of the moving body,
wherein said moving-body unit comprises:
an authentication section for performing an authentication processing by radio communication with said portable unit; and
an operation control section for, after authentication of said portable unit by said authentication section, causing at least one of said steering unlocking section and said moving body power supply control section to perform a predetermined processing in accordance with the input operation signal,
wherein the operation signal is a signal corresponding to a length of time that the operation switch is on, and said operation control section causes said steering unlocking section to perform unlocking when the operation signal of a length not longer than a predetermined period of time is input, and when, after the unlocking, the operation signal of a length not longer than the predetermined period of time is subsequently input, causes said moving body power supply control section to perform power supply control.

2. The moving body starting system according to claim 1, wherein the operation signal is a signal corresponding to the length of time that the operation switch is on, and said operation control section causes said steering unlocking section to perform unlocking and causes said moving body power supply control section to perform power supply control when the operation signal of a length longer than the predetermined period of time is input.

3. The moving body starting system according to claim 1, wherein said operation control section causes said authentication section to perform an authentication processing each time the operation signal is input, and, when said portable unit is authenticated, causes at least one of said steering unlocking section and said moving body power supply control section to perform a predetermined processing in accordance with the input operation signal.

4. The moving body starting system according to claim 1, wherein said moving-body unit performs communication with the driving force generating device control device of the moving body through a communication line, and said operation control section outputting a driving force generating device stop signal to the driving force generating device control device in accordance with the input operation signal.

5. The moving body starting system according to claim 1, wherein the operation switch is a pushbutton type switch.

6. The moving body start system according to claim 1, wherein when the operation signal is input for more than the predetermined period of time, the moving body power supply control section is controlled so as to stop the power supply.

* * * * *